May 16, 1933. H. A. CONNERS 1,909,662
MAGNIFYING AND ILLUMINATING DEVICE
Filed March 18, 1931
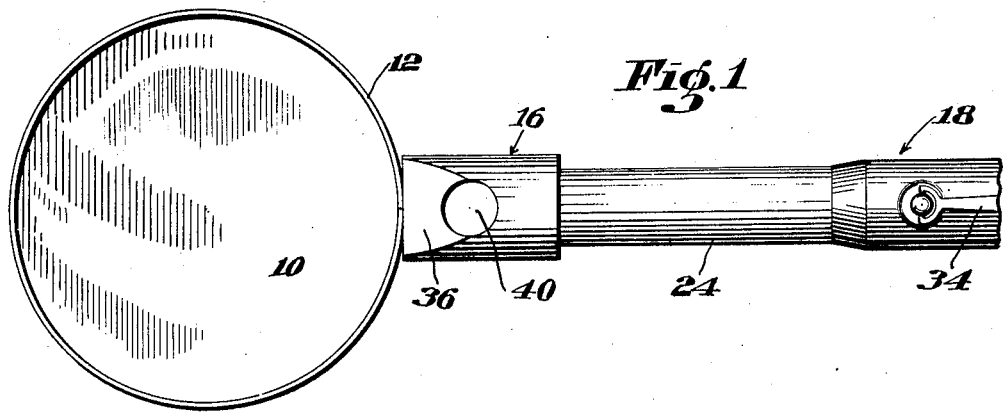
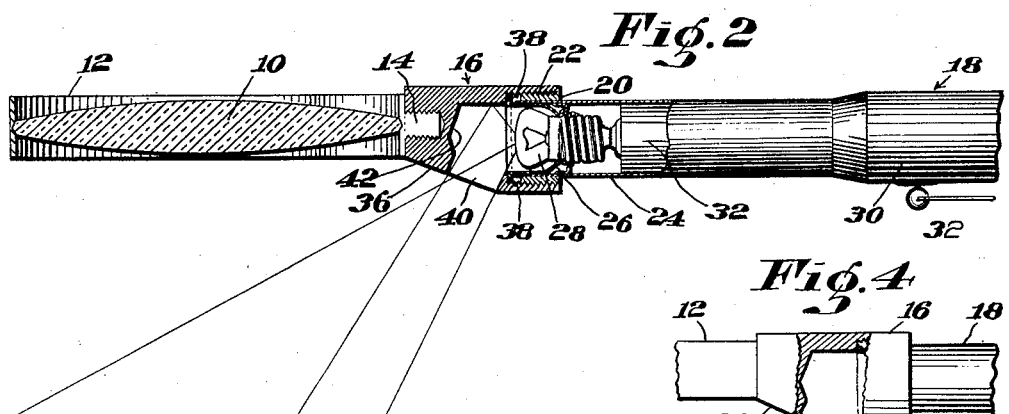
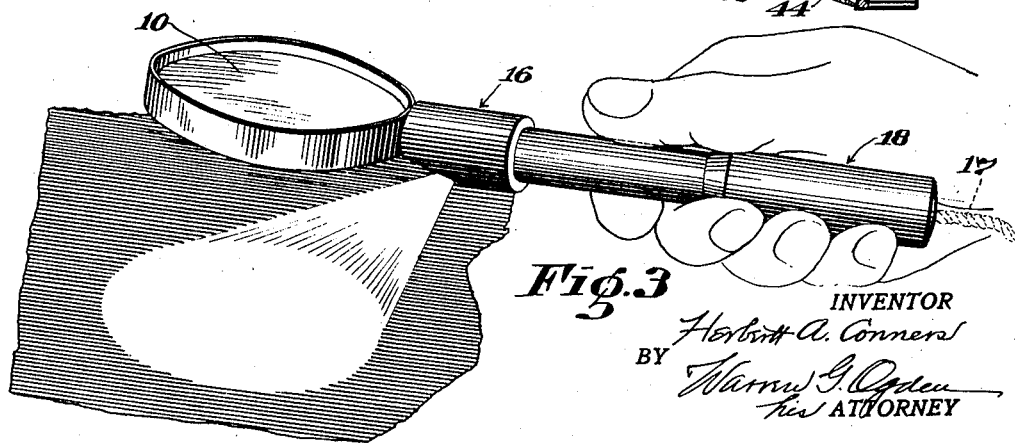
INVENTOR
Herbert A. Conners
BY Warren G. Ogden
his ATTORNEY Patented May 16, 1933

1,909,662

UNITED STATES PATENT OFFICE

HERBERT A. CONNERS, OF LEXINGTON, MASSACHUSETTS, ASSIGNOR TO SWIFT & ANDERSON, INC., OF BOSTON, MASSACHUSETTS, A CORPORATION OF MASSACHUSETTS

MAGNIFYING AND ILLUMINATING DEVICE

Application filed March 18, 1931. Serial No. 523,437.

This invention relates to magnifiers and more especially to hand magnifiers or reading glasses provided with a source of illumination to facilitate their use under adverse light conditions or where the material to be examined is minute or of fine or delicate manufacture.

An object of the invention is to combine in one handy structure a magnifying lens and a source of illumination in such form and manner that the light rays will be substantially concentrated beneath the lens and not be broadly dissipated outside the area being examined.

Accordingly a feature of the invention resides in the use of the handle of a reading glass as a container for a battery-energized electric lamp or, if desired, for wires that may lead to an extraneous source of electric power, there being provision for focusing the light rays emanating from the lamp in a manner to create and preserve a field of light of maximum intensity directly below the lens while the magnifier is in use at reading focus.

To the accomplishment of this object and such others as may hereinafter appear, as will readily be understood by those skilled in the art, the invention comprises the features and combinations of parts hereinafter described and then particularly pointed out in the appended claims.

The nature and scope of the invention will be understood from a description of the preferred embodiment thereof illustrated in the accompanying drawing, in which:

Figure 1 is a view, in underside plan, of the illuminating magnifier, the outer end of the handle being broken away;

Fig. 2 is a a view, in vertical longitudinal section through the lens and lamp socket, the handle being shown broken as in Fig. 1;

Fig. 3 is a view, in perspective, illustrating the field of maximum illumination beneath the lens, and Fig. 4 is a fragmentary view, in elevation, of the frame-block broken away about the light opening to show how an auxiliary, concentrating lens may be fitted therein.

In the embodiment of the invention illustrated in the drawing the magnifier comprises a lens 10 held within a split ring-frame 12 having a split screw 14 (Fig. 2) for threading in a socket in a frame block 16. In the ordinary magnifier for use with an extraneous source of power the frame block would be a part of, or connected to, a hollow handle through which conductors 17 may lead as indicated on Fig. 3. In this invention the handle 18 preferably comprises a tubular flash light of the "Everready" or other convenient make of a suitable size and is mounted on the frame block by applying an externally threaded collar 20 (Fig. 2) at the lamp end by means of which the handle may be screwed into an internally threaded socket 22 formed in the frame block.

The handle, when formed by a flash light, consists of a tube 24 having an internal fitting such as a helical flange near one end, into which a reflector cup 26 containing an electric light bulb 28 may be screwed, and a cap 30 at its other end. A dry cell battery 32 within the handle is maintained by the cap in contact with the bulb stem, and a spring bar 34 carries a ball, operating through a hole in the cap, to close the circuit when the bar is pressed inward.

It is important that the field of illumination provided by the lamp be substantially concentrated, or at its maximum, just beneath the lens 10 when held at reading focus above the material to be examined. A dissipation of the light over a more widely spread area than that which is under magnification, or a much greater intensity at one side, detracts to a material extent from the usefulness of a device of this character in that the material is displayed under adverse rather than improved lighting conditions. For perfection of lighting conditions a nicety of adjustment of the lamp to the lens and control of the light rays is required. The arrangement of the parts in the matter of both relative location of its parts and control of the direction of the beams to secure the desired "spotting" on the material of the lighted area will now be described.

The frame block 16 preferably, but not necessarily, is cylindrical at its outer or handle-receiving end and is slabbed off at the lower side of its inner end downwardly and outwardly from the lens. This produces a face 36 that is inclined to the plane of the lens, an inclination of about 20° having been found, in practice, to give the best results. The frame block is drilled centrally from its outer end for about two thirds of its length (see Fig. 2) the diameter of the bore being substantially the inside diameter of the flash light tube 24. This bore is counterbored and internally threaded to form the handle socket 22 heretofore referred to. As a result of these operations the socket 22 has an outwardly facing, internal shoulder 38 at its base. The shoulder 38, for best results, is just outward of the outer end of the flat under wall formed by the face 36. A circular light outlet 40 is drilled through the flat wall, the drill preferably being held normal to the plane of its face 36 and so centered that the outer edge of the opening thus formed is just inside or back of the shoulder 38 (see Fig. 2). The two drillings, one axially of the frame block and one at an angle of substantially 70° to said axis produce a hood having side walls closed by a forward wall 42 which overhangs or is directly opposite the light bulb and at the inner edge of the intervening light outlet 40. The interior surfaces of the hood may be used as a reflector.

When the handle is screwed, by its threaded collar 20, into the outer end, or socket 22, of the axial bore in the frame block, the beaded edge of the reflector 26 seats against the shoulder 38 thus locating the filament of the light bulb just outward of the light opening 40. This construction provides for a hooded lamp with the radiation of its light rays being confined to a downward and forward direction through the downwardly and forwardly inclined passage or light opening 40 in the under wall of the frame block.

The fainter horizontal line in Fig. 2 indicates the surface of some material to be examined, spaced from the lens 10 at a normal reading focus. The fainter oblique lines indicate the main direct and reflected light rays from the lamp and show graphically how the hood controls the projection of the beams of light and confines the more intense portion of the illuminated area to that portion of the reading surface which is magnified by the lens 10. Fig. 3 shows, in perspective, that which has just been described as being shown graphically by Fig. 2, except that the drawing shows a somewhat sharper demarcation between light and darkness than is true in practice.

Figure 4 shows a slight modification. For some kinds of work for which the device may be used it is found desirable to still further concentrate the light rays upon the magnified area of the reading surface. To effect this a lens 44, having its faces ground to the proper shape for gathering the light rays from within the hood and then directing them to a preselected area beneath the lens 10, may be mounted in a seat formed at the lower edge of the light outlet 40.

The nature and scope of the present invention having been indicated and its preferred embodiments having been specifically described, what is claimed as new is:—

1. An illuminating reading glass comprising a lens and handle therefor substantially in the same plane, a light bulb in the handle, and means intermediate the lens and the bulb constituting an open bottomed opaque enclosing light ray chamber constructed to confine and direct the light rays through said open bottom substantially as a cone of light to a field substantially below the lens when held at reading focus from the material to be examined.

2. An illuminating reading glass comprising a cylindrical frame block constituting an enclosing opaque light ray chamber adapted to project the light rays as a cone of light and having one end slabbed off forming a flat face, an axial bore open at its other end but having a solid portion at its slabbed end and a light outlet in the wall formed by said flat face communicating with said bore, a lens so mounted on said solid end that the plane of said flat face is inclined to the plane of the lens, and a handle containing a light bulb at its inner end mounted in the outer end of said bore with said bulb outward of the light outlet.

3. An illuminating reading glass according to claim 2 in which the said axial bore is provided with an outwardly facing internal shoulder limiting entry of the handle in said bore and determining the relation of the light bulb to the light outlet.

4. An illuminating reading glass according to claim 2 in which the light outlet is circular and a lens is seated therein.

5. A frame block constituting an enclosing opaque light ray chamber adapted to project the light rays as a cone of light for illuminating reading glasses adapted to have a lens and a handle connected to opposite ends thereof comprising a member that is hollow for a considerable part of its length being solid at the lens end and open at the handle end, and having a passage through its wall communicating with the hollow interior, the direction of said passage being inclined toward the lens end of said member.

6. A frame block constituting an enclosing opaque light ray chamber adapted to project the light rays as a cone of light for illuminating reading glasses according to claim 5 in which the hollow member consists of a cylinder axially bored from the handle end and having its lens end slabbed off forming a flat face inclined to the axis of the cylinder, and said inclined passage is through the wall formed by said flat face and normal to the plane thereof.

7. In an illuminating reading glass, a lens seated in a lens ring, a hollow frame block constituting an enclosing opaque light ray chamber adapted to project the light rays as a cone of light and having one solid end to which said lens ring is secured and one open end adapted to receive a handle containing a source of illumination, said frame block also having a light outlet passage through its under wall the direction of which is inclined to the plane of said lens.

In testimony whereof I affix my signature.

HERBERTT A. CONNERS.